(12) United States Patent
Caspi et al.

(10) Patent No.: US 7,697,924 B2
(45) Date of Patent: Apr. 13, 2010

(54) METHOD AND APPARATUS FOR COST OPTIMIZATION OF CELLULAR NETWORKS INDICATION

(75) Inventors: Rami Caspi, Sunnyvale, CA (US); Jeffrey M. Blohm, Portola Valley, CA (US)

(73) Assignee: Siemens Communications, Inc., Boca Raton, FL (US)

(*) Notice: Subject to any disclaimer, the term of this patent is extended or adjusted under 35 U.S.C. 154(b) by 826 days.

(21) Appl. No.: 11/408,380

(22) Filed: Apr. 21, 2006

(65) Prior Publication Data

US 2007/0250580 A1  Oct. 25, 2007

(51) Int. Cl.
*H04M 3/42* (2006.01)
*G06F 15/16* (2006.01)

(52) U.S. Cl. .......... 455/415; 455/414.1; 709/206; 709/207

(58) Field of Classification Search .......... 455/415, 455/414.1, 566; 709/206, 207
See application file for complete search history.

(56) References Cited

U.S. PATENT DOCUMENTS

| | | | |
|---|---|---|---|
| 6,757,365 B1 * | 6/2004 | Bogard | 379/88.17 |
| 7,409,428 B1 * | 8/2008 | Brabec et al. | 709/206 |
| 2006/0031370 A1 * | 2/2006 | Lyle et al. | 709/207 |
| 2006/0234703 A1 * | 10/2006 | Wuthnow et al. | 455/433 |
| 2007/0135128 A1 * | 6/2007 | Villa et al. | 455/445 |

* cited by examiner

*Primary Examiner*—George Eng
*Assistant Examiner*—Un C Cho

(57) ABSTRACT

A telecommunications system includes a personal computer having a unified communication system including a presence application and a cellular telephone network identifier operably coupled to the unified communication system and configured to identify a cellular telephone network of multiple parties; and a cellular network gateway appliance operably coupled to the personal computer and configured to allow the unified communication system to make a telephone call via an associated cellular network and identified by the cellular telephone network identifier.

14 Claims, 11 Drawing Sheets

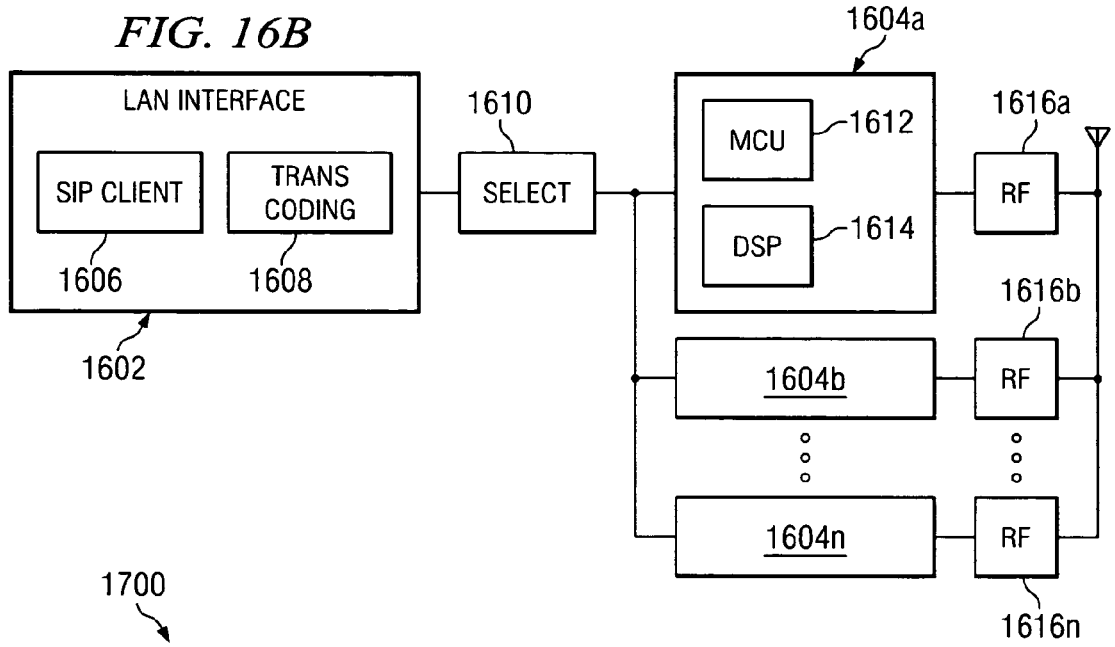
FIG. 16B
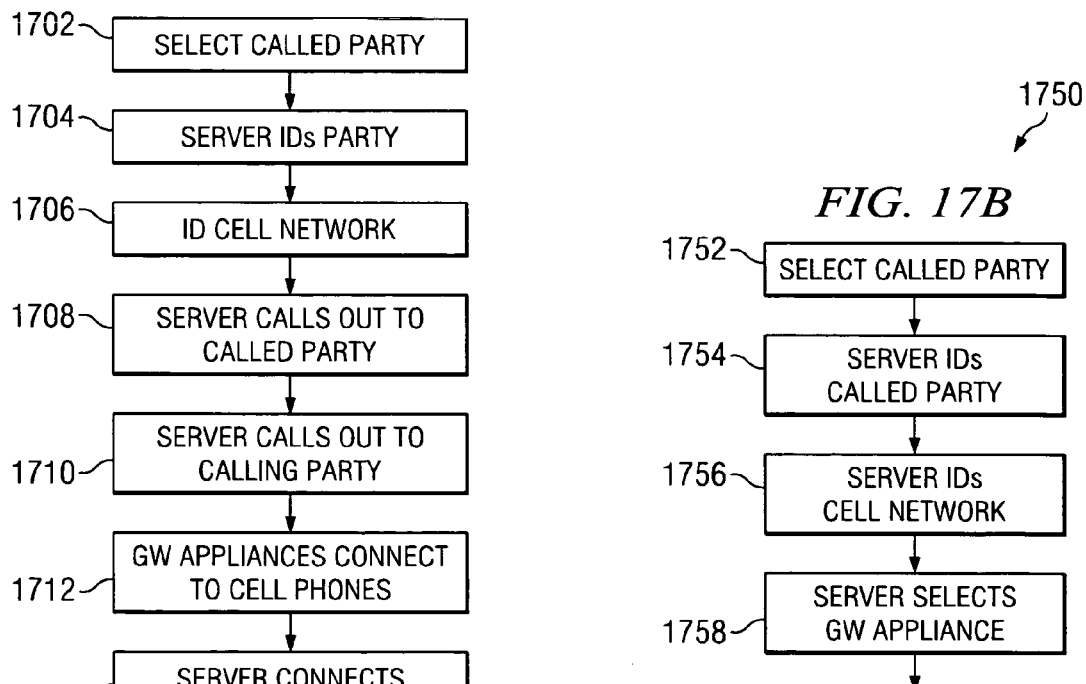
FIG. 17A
FIG. 17B

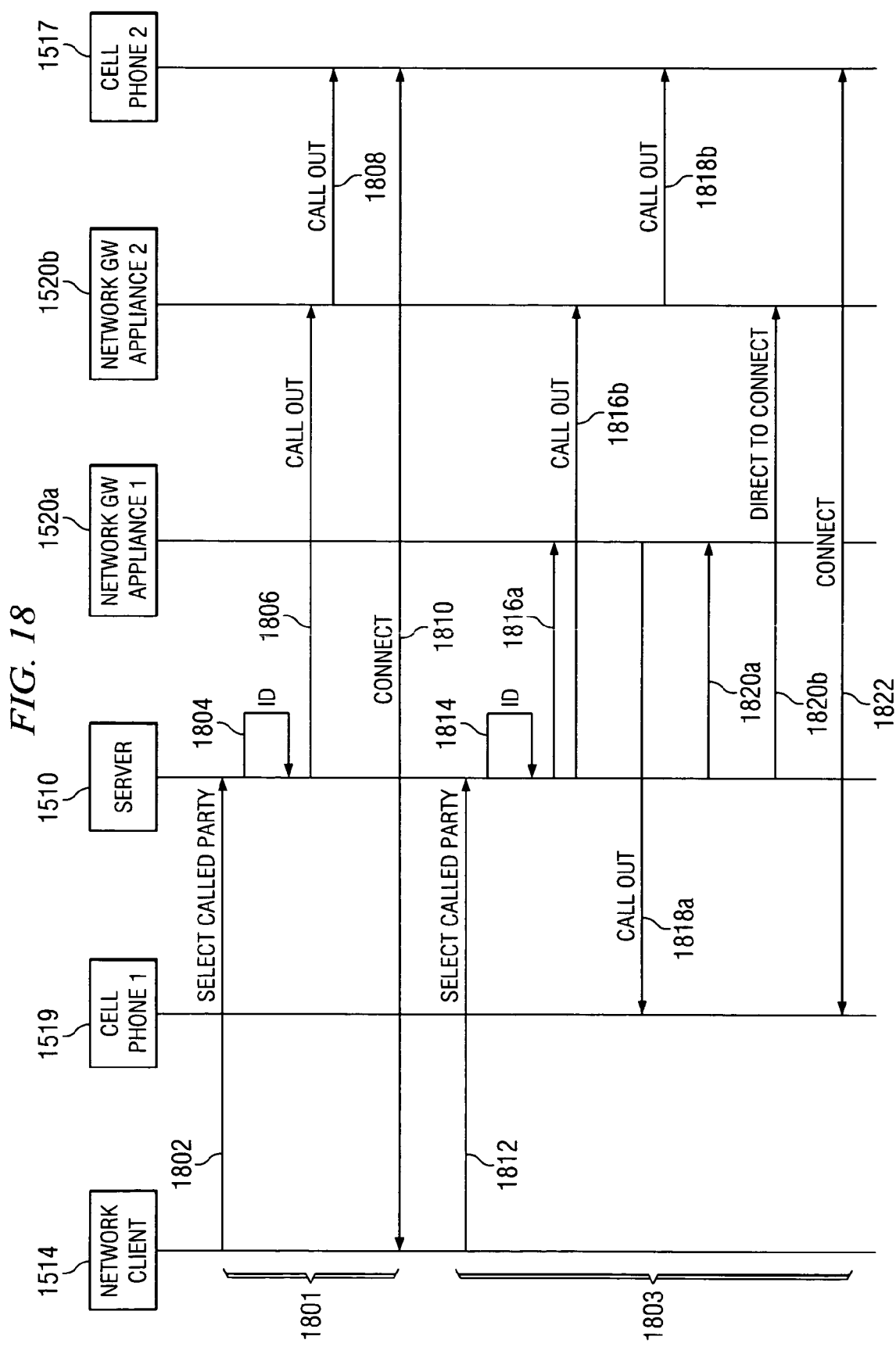

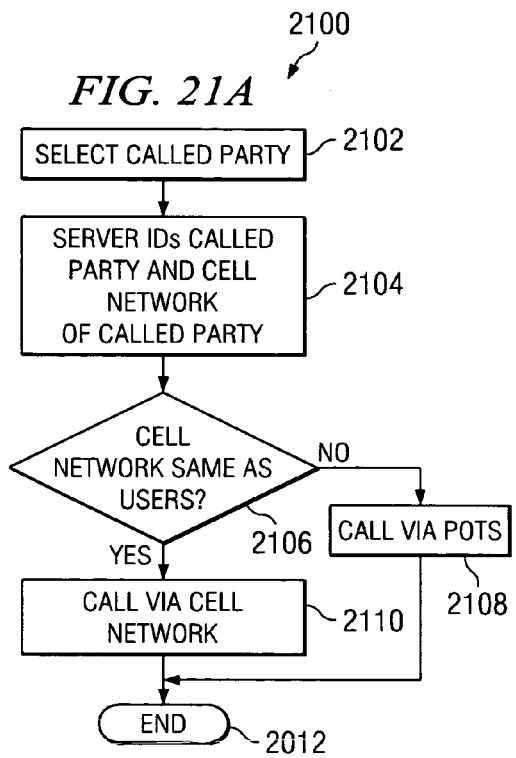
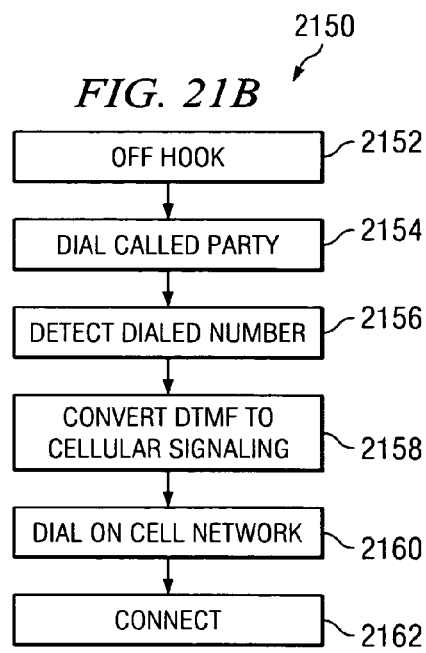
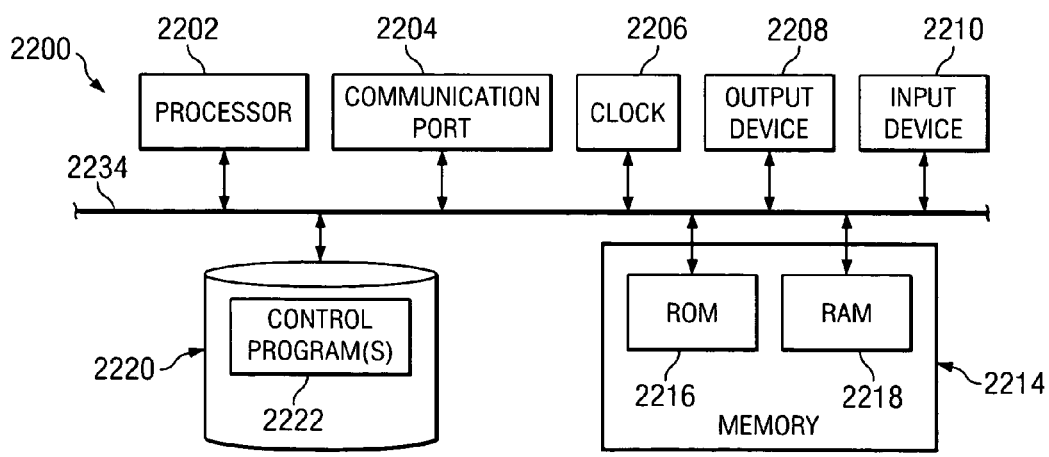

US 7,697,924 B2

METHOD AND APPARATUS FOR COST OPTIMIZATION OF CELLULAR NETWORKS INDICATION

CROSS-REFERENCE TO RELATED APPLICATIONS

The present application is related to commonly-assigned, co-pending application Ser. No. 11/408,325, entitled METHOD AND APPARATUS FOR PRESENCE INDICATION OF CELLULAR TELEPHONES, filed concurrently herewith.

BACKGROUND OF THE INVENTION

1. Field of the Invention

The present invention relates to telecommunications systems and, in particular, to an improved cellular telephone system.

2. Description of the Related Art

The cost of a conventional voice telephone call depends on many factors. Local calls within the same area code generally cost less than calls between different area codes. Calls between more remotely located area codes, regions, or countries can be still more expensive.

As a consequence, many individuals make use of cellular telephones for long distance calls. In such cases, users are charged on a per minute basis, regardless of the distance between called and calling parties. However, cellular service providers generally do not charge if the call is completely within their network. Thus, for example, if the calling and called parties' service is provided by Cingular, there is no charge for the call.

However, in such cases, there is no way for a caller to know which network the called party is on unless the caller has been told and remembers or has written down the information. As such, a typical caller cannot usually affirmatively take advantage of the cost savings provided.

SUMMARY OF THE INVENTION

These and other drawbacks in the prior art are overcome in large part by a system and method according to embodiments of the present invention. A telecommunication method in accordance with an embodiment of the present invention includes identifying called and calling parties' cellular telephone networks; creating a first call leg to a called party cellular telephone via a first gateway associated with the first cellular network; and creating a second call leg to a calling party cellular telephone via a second gateway associated with the second cellular network.

A telecommunications system in accordance with an embodiment of the present invention includes a personal computer having a unified communication system including a presence application and a cellular telephone network identifier operably coupled to the unified communication system and configured to identify a cellular telephone network of multiple parties; and a cellular network gateway appliance operably coupled to the personal computer and configured to allow the unified communication system to make a telephone call via an associated cellular network and identified by the cellular telephone network identifier. In some embodiments, the system further includes a second cellular gateway appliance that couples to the personal computer via the local area network and wherein the unified communication system is configured to call out to parties on via the local area network and first and second cellular gateway appliances A telecommunications system in accordance with an embodiment of the present invention includes a network including a plurality of user devices having unified communications applications and a plurality of cellular network gateways; means interfaceable via the unified communications application for identifying a cellular network associated with a called party and a calling party; means for creating a first call leg to a called party cellular telephone via a first gateway associated with the first cellular network; means for creating a second call leg to a calling party cellular telephone via a second gateway associated with the second cellular network; and means for connecting the first leg and the second leg such that the called party and said calling party communicate via the network.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 16A and FIG. 16B illustrate an exemplary cellular gateway appliance according to embodiments of the present invention.

FIG. 17A and FIG. 17B are flowcharts illustrating operation of embodiments of the present invention.

FIG. 18 is a signaling diagram illustrating operation of embodiments of the present invention.

FIG. 21A and FIG. 21B are flowcharts illustrating operation of embodiments of the present invention.

FIG. 22 is a block diagram of an apparatus according to an embodiment of the present invention.

DETAILED DESCRIPTION OF EMBODIMENTS OF THE INVENTION

Figure 1:
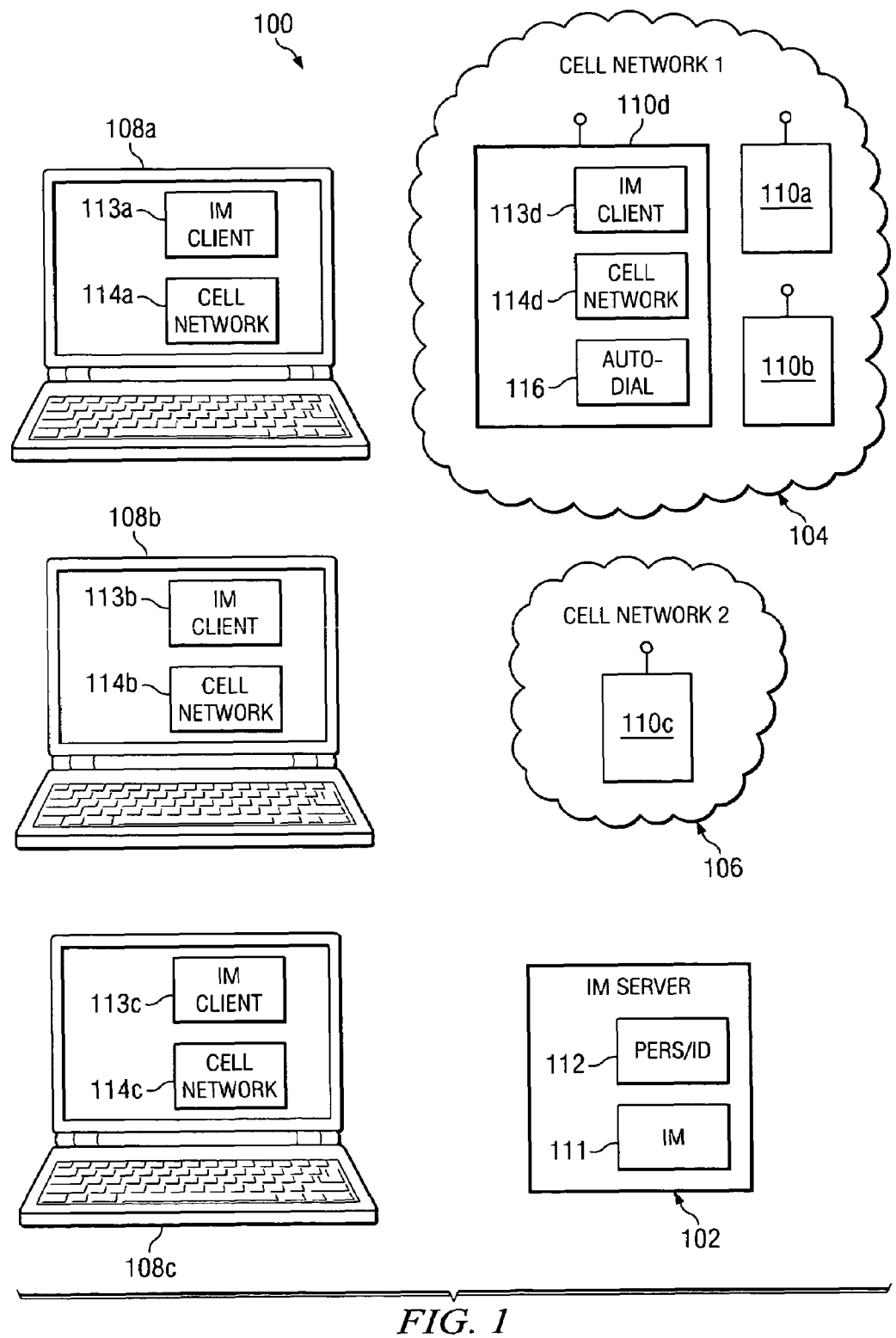
FIG. 1 is a diagram illustrating a system according to embodiments of the present invention.

Turning now to the drawings and, with particular attention to FIG. 1, a diagram of a telecommunications system 100 in accordance with embodiments of the present invention is shown. In the embodiment illustrated, the system 100 includes a presence or Instant Messaging server 102, a first cellular telephone network 104, a second cellular telephone network 106, one or more computers 108a-108c, and one or more associated cellular telephones 110a-110d.

First cellular telephone network 104 and second cellular telephone network 106 may be networks operated by different service providers or carriers, such as Sprint, Cingular, T-Mobil, Nextel, and Verizon. Furthermore, first cellular telephone network 104 and second cellular telephone network 106 may operate according to same or different telecommunications standards, such as GSM, CDMA, TDMA, AMPS, etc. The first cellular telephone network 104 and second cellular telephone network 106 may couple to or be in communication with the public switched telephone network (PSTN) (not shown).

In the example illustrated, the cellular telephones 110a-110d are compatible with one of the cellular networks 104, 106. In particular, in one embodiment, the cellular telephones 110a, 110b, 110d are served by network 104, and cellular telephone 110c is served by network 106.

In addition, an Instant Messaging system 111 is provided, in conjunction with server 102, and Instant Messaging clients 113a-113d. The Instant Messaging system may be implemented as an Instant Messaging system such as MSN Messenger, AOL Instant Messenger, those provided by Google or Yahoo, or enterprise IM systems. An exemplary enterprise presence and IM system is Microsoft Live Communication server, which can support Windows Messenger, Office Communicator, Communicator Web Access, and Communicator Mobile clients. Another is the IBM Sametime server that supports the Sametime Connect client.

The Instant Messaging system 111 may be implemented in an Instant Messaging server 102, which may be a conventional instant messaging server, but provided with a cellular network identification unit 112 in accordance with embodiments of the present invention. As will be explained in greater detail below, the cellular network identification unit 112 operates to receive cellular network associations from users and transmit indications or indicia of the associations to other users. It is noted that, while illustrated as implemented in a single server, the Instant Messaging system 111 and the cellular network identification unit 112 may be implemented in hardware and/or software operating on one or more servers, computer systems, host or mainframe computers, workstations, etc. It is further noted that, while illustrated as an instant messaging server, the server 102 may be any suitable server that makes use of presence information.

The computers 108a-108c may implement presence or instant messaging clients 113a-113c and cellular network identification control units 114a-114c for identifying the cellular networks of associated contacts, as will be explained in greater detail below. In some embodiments, an instant messaging client 113d may be implemented on a cell phone 110d, which may also implement a cellular network identification control unit 114d. Such a cellular telephone 110d may also implement an auto-dialer 116 which can be used to automatically dial a contact making use of a common cellular network, as will be explained in greater detail below.

More particularly, the cellular network identification control units 114a-114d operate in conjunction with the Instant Messaging client programs 113a-113d to provide display of the cellular networks associated with parties on buddy or contact lists maintained at the Instant Messaging client programs 113a-113d. In certain embodiments, the cellular network identification control units 114a-114d may be implemented as plug-ins to the Instant Messaging client programs 113a-113d. The Instant Messaging client programs 113a-113d can communicate over the Internet or other networks with each other and with the server 102 for example in a conventional manner, such as via a suitable TCP connection. It is noted that in certain embodiments, the clients 108a-108d communicate directly with one another; thus, the figure is exemplary only. The Instant Messaging client programs 113a-113d and the cellular control units 114a-114d may be implemented in hardware and/or software operating on one or more servers, computer systems, host or mainframe computers, workstations, etc.

In operation, as will be explained in greater detail below, a user of the Instant Messaging system 102 can upload a cellular network identification associated with his cellular telephone, for example, during self-configuration. The IM server 102 will then associate the network with the user on other parties' contact lists. When the contact lists are displayed at the respective Instant Messaging clients, the cellular network information for contact list members is provided, for example, as a graphical indication on a graphical user interface, such as a suitable icon, a background color, or other color-coded indication. In certain embodiments, a common display of multiple clients for a common cellular network may be used. For example, a given network may be assigned a particular color or indicia across multiple client devices; in other embodiments, the color or indicia is user configurable. The user can then decide whether the party is on his same network and make his call accordingly. In embodiments in which an Instant Messaging client is provided in the cellular telephone itself, the call can be made either automatically or manually.

Figure 2:
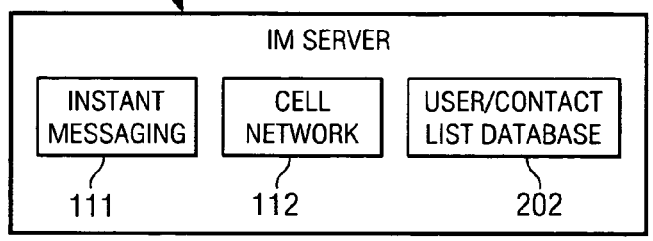
FIG. 2 is a diagram illustrating a presence server according to embodiments of the present invention.

Turning now to FIG. 2, a block diagram of an exemplary Instant Messaging server 102 is shown. As noted above, the IM server 102 may be representative of an Instant Messaging server for a system such as MSN Messenger, AOL Instant Messenger, those provided by Google or Yahoo, or enterprise IM systems, such as Microsoft Live Communications Server, or IBM Sametime server. Thus, the server 102 includes an instant messaging control 111 and a user-contact list database 202. In addition, the server 102 includes a cellular network identification unit 112 in accordance with embodiments of the present invention.

The instant messaging control 111 is responsible for receiving, transmitting, routing, etc., text and control messages for instant messaging and control sessions. In addition, the instant messaging control 111 may include a presence control (not shown) for implementing presence capabilities. That is, the instant messaging control 111 can monitor, inter alia, the on line or available status of registered users, which can be displayed at the client(s).

The user-contact database 202 stores user information and user contact lists, as well as current contact status. The cellular network identification unit 112 operates in conjunction with the user-contact database 202 to receive cellular network identification associated with users and, particularly, parties on contact lists.

In operation, as will be explained in greater detail below, a user can upload a contact list of parties whose status he wants monitored, as well as the user's own cellular telephone network identification. This may be accomplished, for example, using standard IM control signaling channels, typically over a TCP connection. Then, when contact status is transmitted to the user by the IM control 111, the information can include other user's cellular networks.

Figure 3:
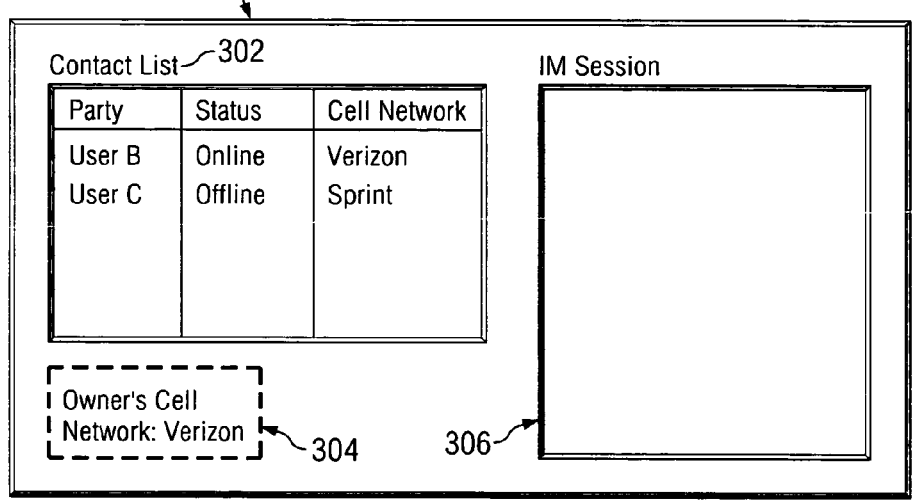
FIG. 3 is a diagram of an exemplary user interface according to embodiments of the present invention.

More particularly, turning now to FIG. 3, a diagram illustrating an exemplary Instant Messaging client window 300 is shown. The instant messaging client window 300 may be generated by one of the instant messaging clients 113a-113d in conjunction with an operating system (not shown). More particularly, in certain embodiments, the computers 108a-108c may be implemented as personal computers running, for example, the Windows XP operating system. The Instant Messaging window 300 includes a contact list manager 302, a network identifier manager 304, and a messaging session manager 306. The contact list manager 302 allows a user to create, edit, etc., contact lists, and view their status. In addition, in certain embodiments, the contact list manager 302 allows the user to see the cellular network of contacts. Thus, in the example illustrated, a User B is Online and uses Verizon as his cellular carrier. User C, however, is Offline, and uses Sprint as his carrier. It is noted that, while in the example illustrated, the cellular networks are textually identified, in other embodiments, as will be explained in greater detail below, a color coding, one or more specific icons, or other indicia, may be applied to identify each cellular network.

Figure 4:
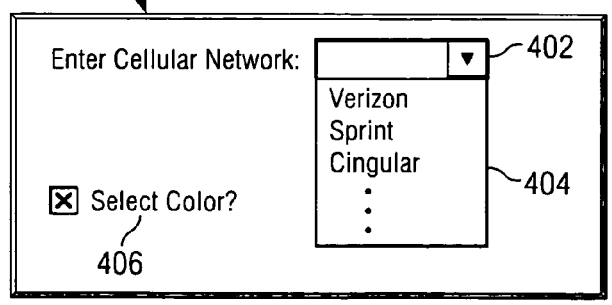
FIG. 4 is a diagram of an exemplary user interface according to embodiments of the present invention.

An exemplary network identifier manager 304 for selecting the cellular network is shown in FIG. 4. The network identifier manager 304 may include a dropdown menu 402. In operation, the user can select the desired entry 404 in the menu 402 and highlight or otherwise select using a cursor pointing tool, for example, a particular network. The system according to certain embodiments may then assign a default color or other indicia. In certain embodiments, the user may select a color or other cellular network indicia.

Figure 5A:
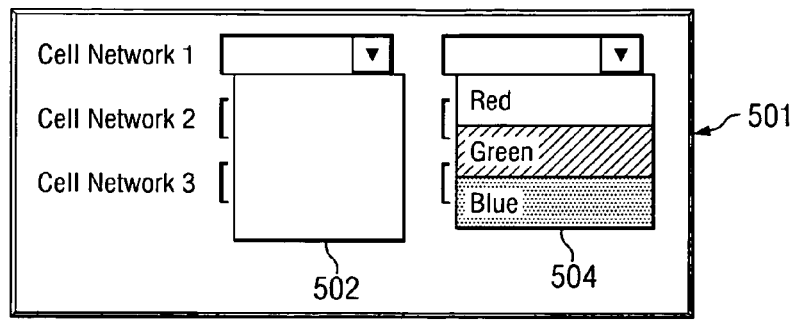
FIG. 5A and FIG. 5B are diagrams of exemplary user interfaces according to embodiments of the present invention.

This is shown more particularly in FIG. 5A. In particular, FIG. 5A represents an exemplary indicia or color selection window or dialog 501 that might be displayed when the select color box 406 of FIG. 4 is selected. In particular, according to certain embodiments, each cellular network may be assigned a particular color identifier from dropdown windows. In certain embodiments, each cellular network may be specifically identified using the dropdown 502. That is, "Cellular network 1" may be defined to be "Sprint," etc.

In addition, in the example illustrated, using the dropdown 504, a first cellular network is assigned the color RED; a second cellular network is assigned the color GREEN; a third cellular network is assigned BLUE. When the individual contact is displayed, his name, or the background, can be shown in the particular color. This can provide an easy reference for the user. It is noted, however, that different indicia can be used, such as, for example, icons, text, etc.

Figure 5B:
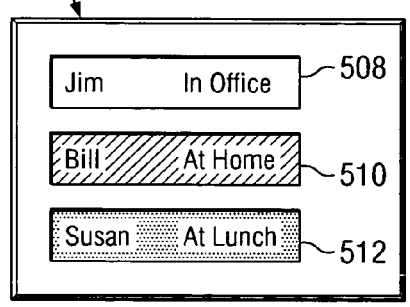

FIG. 5B illustrates an exemplary window 506 that could be used to display the presence status and cell networks of the various parties on the user's contact lists. In particular, shown are contact entries for Jim 508, Bill 510 and Susan 512. In the example illustrated, Jim is In Office, Bill is At Home, and Susan is At Lunch. In addition, the background for Jim is displayed in RED; the background for Bill is in GREEN; and the background for Susan is BLUE to identify their cellular networks. It is noted that in other embodiments, other display indicia are possible. For example, colored icons could be provided; in still others, only contacts who make use of the same cell network as the user are displayed in color or differently from other users.

Figure 6:
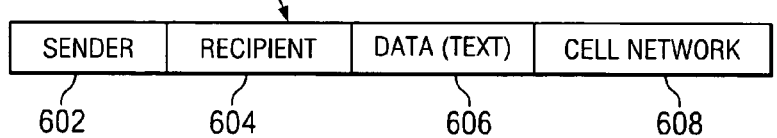
FIG. 6 illustrates an exemplary data element according to embodiments of the present invention.

An exemplary data element 600 that may be used to carry cellular network identification information is shown in FIG. 6. The data element 600 may be generated by the IM control 111 in response to user commands. The data element 600 includes sender ID 602, recipient info 604, data 606, and cellular identification 608. In operation, the IM control 111 can generate the data element 600 when the user selects his cellular network, using, for example, the dropdown window of FIG. 5. The element then may be transmitted to the server 102, which can provide the information to other parties using a same or similar data element, when they transmit presence status.

Figure 7:
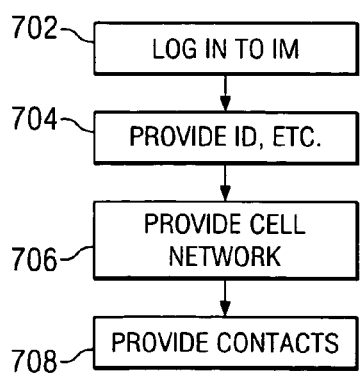
FIG. 7 is a flowchart illustrating operation of embodiments of the present invention.

Turning now to FIG. 7, a flowchart 700 illustrating operation of embodiment of the present invention is shown. The particular arrangement of elements in the flowchart 700 is not meant to imply a fixed order to the elements; embodiments can be practiced in any order that is practicable.

In a step 702, a user can log in to the IM server 102. This may be accomplished, for example, by the user opening his IM client 113a-113d, which may then automatically open a TCP connection to the server 102. In a step 704, the user's client 113 will provide identification, etc., for his account. In a step 706, the user can select his cellular network carrier, for example, by using the menu of FIG. 4-5. In some embodiments, the user may also provide his telephone number, as well. The selection is transmitted to the server 102. In addition, in a step 708, the user can provide his list or lists of contacts whose online status he wishes to monitor. The user may also transmit his own presence status.

Figure 8:
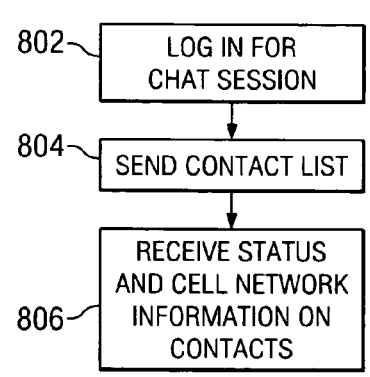
FIG. 8 is a flowchart illustrating operation of embodiments of the present invention.

Turning now to FIG. 8, a flowchart 800 illustrating operation of embodiment of the present invention is shown. The particular arrangement of elements in the flowchart 800 is not meant to imply a fixed order to the elements; embodiments can be practiced in any order that is practicable.

In a step 802, a user can log in for a chat session. Again, this can include the user opening his IM client 113, which can then communicate log in information to the server 102, as well as the user's current status. In a step 804, the user can send or update his contact list. Finally, in a step 806, the user can receive the status of his contacts including information on the cellular networks of the associated contacts.

It is noted that, in certain embodiments, the cellular telephone 110 may itself be provided with the capability of displaying a contact's cellular network affiliation. For example, certain cellular telephones may be provided with instant messaging or other messaging capabilities that involve use of contact lists and presence features.

Figure 9:
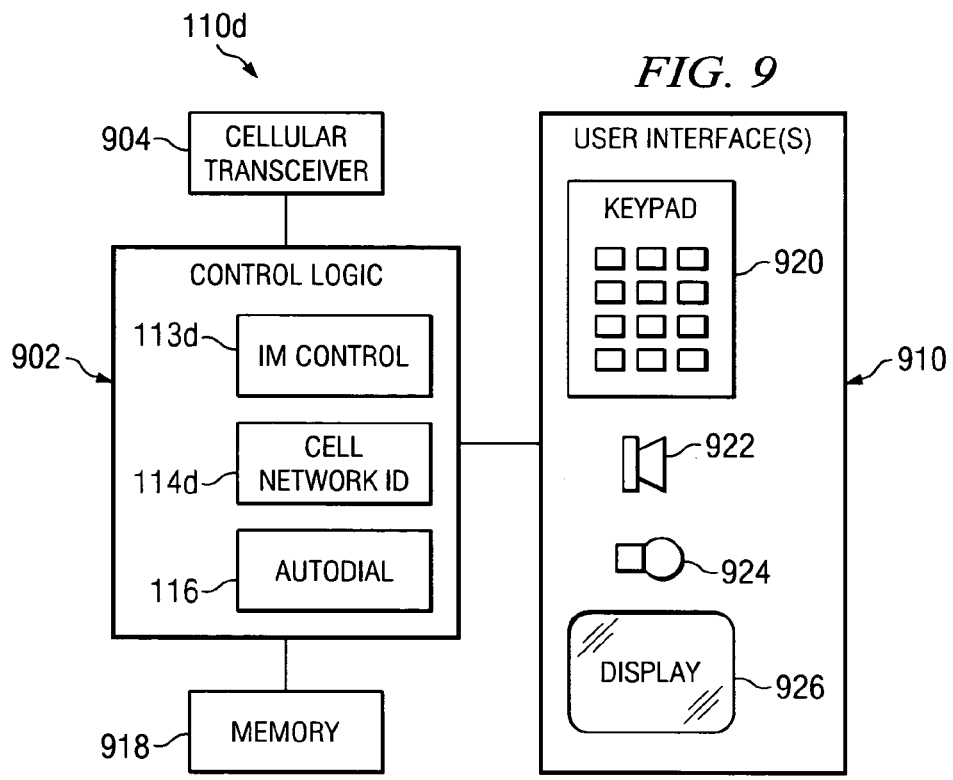
FIG. 9 is a block diagram of a user device according to embodiments of the present invention.

An exemplary cellular, telephone 110d including cellular network display capabilities in accordance with an embodiment of the present invention is shown in FIG. 9. In some embodiments, the cellular telephone 110d may implement one or more elements of the methods disclosed herein. As shown, the cellular telephone includes control logic 902 and cellular transceiver 904. The cellular transceiver 904 allows communication over a cellular telephone network, such as a GSM or GPRS based cellular telephone network. The control logic 902 generally controls operation of the cellular telephone and includes an IM control 113d, a cellular network identification control unit 114d, and an auto-dialer 116.

The control logic 902 interfaces to a memory 918 for storing, among other things, program controls and contact lists; and user interface(s) 910. The user interface(s) 910 can include a keypad 920, speaker 922, microphone 924, and display 926. The keypad 920 may include one or more "hard"

keys and may be implemented in whole or in part as a cursor pointing device in association with one or more "virtual" keys on the display 926. It is noted that other interfaces, such as voice activated interfaces, may be provided. Thus, the figure is exemplary only.

As noted above, the control logic 902 may implement an IM control 113*d*, a cellular network identification control unit 114*d*, and an auto-dialer 116. The control logic 902 may be implemented as various combinations of hardware, software, or firmware and, in particular, may be implemented as one or more control processors. The IM client 113*d* and the cellular network identification control unit 114*d* may operate in a manner similar to that discussed above with the clients of personal computers 110*a*-110*c*.

In addition, the cellular network identification control unit 114*d* may be provided by the cell provider with routines to automatically identify when a number or other party is on the same network. Further, when a party is entered into a contact list, the user may be given the option of selecting that party's number on the common network as a default; then, the auto-dialer 116 can be used to always automatically call the contact at the cell number.

Figure 10:
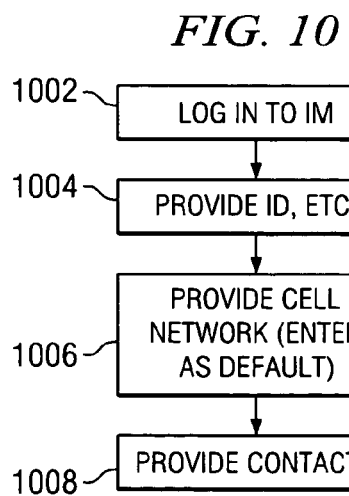
FIG. 10 is a flowchart illustrating operation of embodiments of the present invention.

Turning now to FIG. 10, a flowchart 1000 illustrating operation of embodiment of the present invention is shown. The particular arrangement of elements in the flowchart 1000 is not meant to imply a fixed order to the elements; embodiments can be practiced in any order that is practicable.

In a step 1002, a user can log in to the IM server 102 with his cellular telephone. This may be accomplished, for example, by the user opening his IM client 113*d*, which may then automatically open a TCP connection to the server 102. One method of conveying such information may include SIP methods over TCP using GPRS or EDGE data services.

In a step 1004, the user's client 113 will provide identification, etc., for his account, which can include his telephone number. In a step 1006, the user can elect his cellular network carrier, for example, by using a menu similar to that of FIG. 4-5. Alternatively, the information can be automatically read by the client (for example, by accessing the cellular control unit's self-identification or network search routines). In addition, in a step 1008, the user can provide his list or lists of contacts whose online status he wishes to monitor. The user may also transmit his current presence status.

Figure 11:
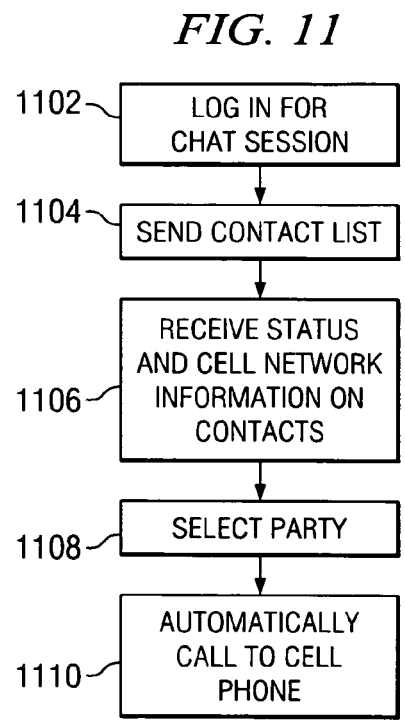
FIG. 11 is a flowchart illustrating operation of embodiments of the present invention.

Turning now to FIG. 11, a flowchart 1100 illustrating operation of embodiment of the present invention is shown. The particular arrangement of elements in the flowchart 1100 is not meant to imply a fixed order to the elements; embodiments can be practiced in any order that is practicable.

In a step 1102, a user can log in for a chat session. Again, this can include the user opening his IM client 113, which can then communicate log in information to the server 102. In a step 1104, the user can send or update his contact list, and current presence status. In a step 1106, the user can receive the status of his contacts including information on the cellular networks of the associated contacts. In a step 1108, the user can select a contact, for example, by highlighting the entry using his cursor pointing device. Then, in a step 1110, the auto-dialer 116 can automatically call the party at the previously entered default cellular network number.

Figure 12:
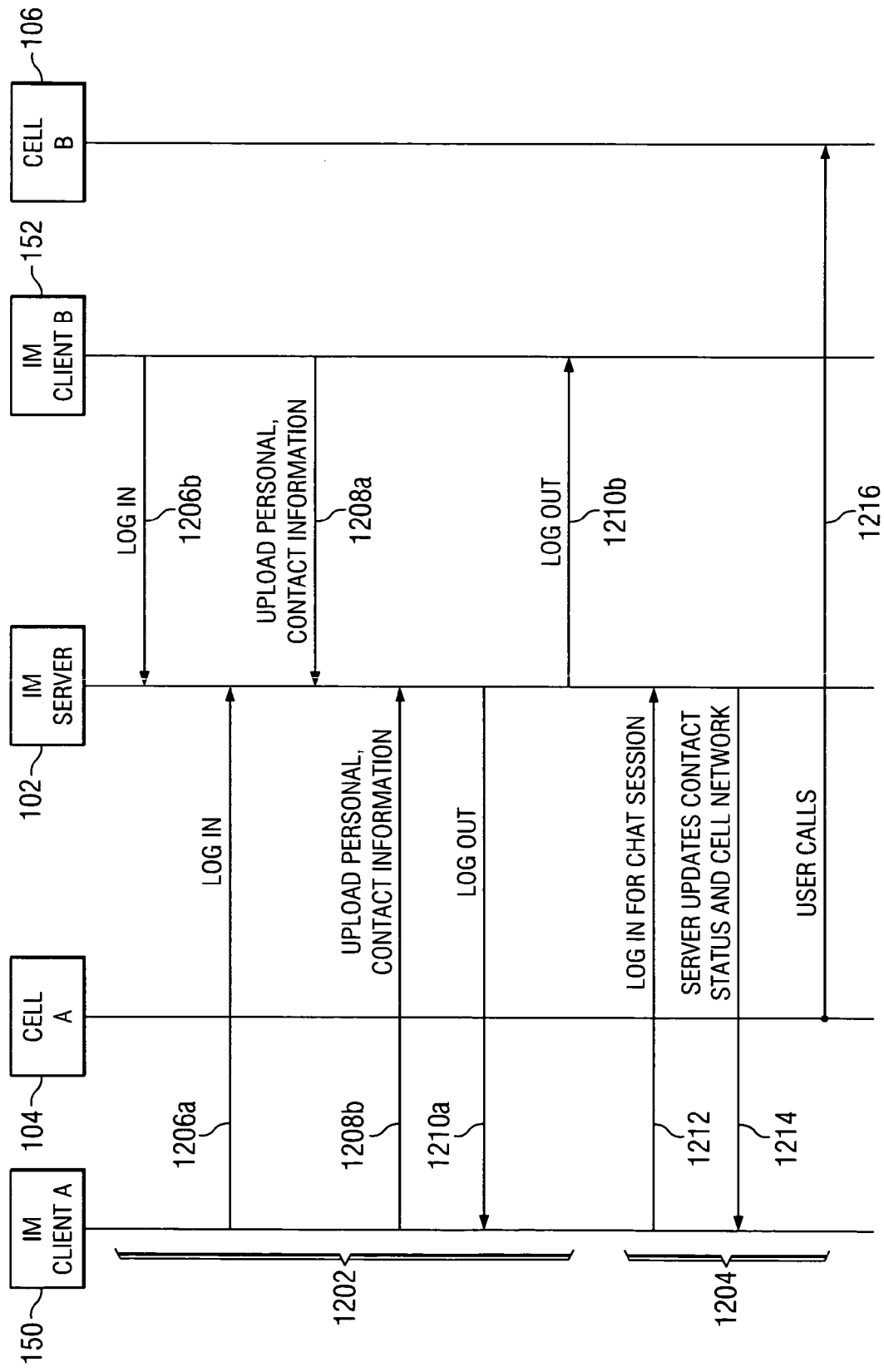
FIG. 12 is a signaling diagram illustrating operation of embodiments of the present invention.

Turning now to FIG. 12, a signaling diagram illustrating operation of an exemplary embodiment of the present invention is shown. Shown are an IM client 150, a cell network 104, an IM server 102, an IM client 152, and a cell network 106. The IM clients 150, 152 may be representative of the IM clients 113*a*-113*d* of FIG. 1.

Shown at 1202 is exemplary signaling for configuring the IM server 102 with cell network information. Shown at 1204 is signaling for receiving cell phone information.

In 1206*a*, IM client 150 can log in to server 102. As noted above, this can include the client opening a TCP connection with the server 102, etc. The IM client 152 can similarly log in at 1206*b*. The clients can upload their personal, contact list, and cellular telephone information at 1208*a*, 1208*b*. The server 102 can then process the received information, for example, correlating and storing contact lists and cellular network information in the various databases. At 1210*a*, 1210*b*, the IM clients 150, 152 can log out. As discussed above, in embodiments in which the IM client is on a cell phone, the user can also elect that network as his default contact for other parties.

At 1212, a user, such as a user of client 150, can log in to the server 102 for a chat session. At 1214, the server 102 can download to the client the contact information and cellular network identification of parties on his contact list. Finally, at 1216, the user can call the other party using the appropriate cell network. As discussed above, in embodiments in which the cellular network identification control unit is on the cellular telephone, the cellular telephone's auto-dialer may be used to make the call.

Figure 13:
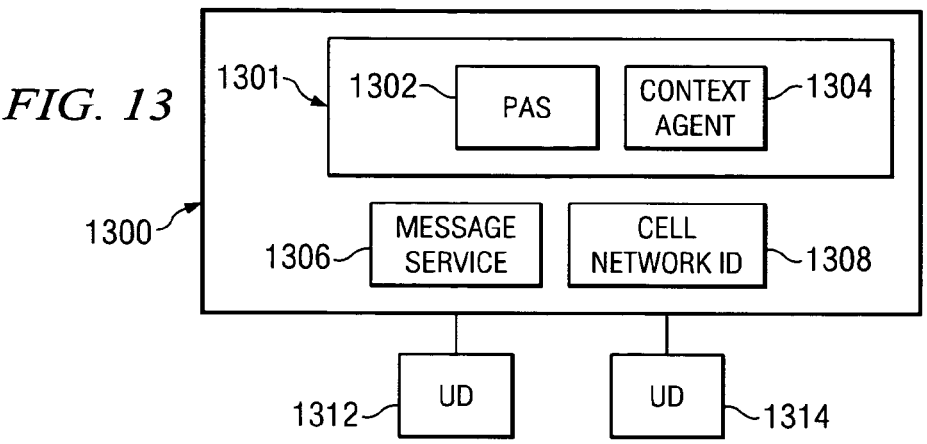
FIG. 13 is a diagram illustrating a system according to embodiments of the present invention.

In addition to the above-described embodiments, the present invention is also capable of being implemented as part of a network-based system, such as a unified presence or communications system. Turning now to the drawings and, with particular attention to FIG. 13, a diagram of a telecommunications system 1300 according to an embodiment of the present invention is shown. The system includes a presence service 1301 connected to or in communication with an application such as a text messaging service 1306, e.g., an instant messaging service. The presence service 1301 may include a presence and availability service (PAS) 1302 and a context agent 1304.

User devices, such as user devices 1312, 1314 may be connected to or in communication with the presence service 1301 and the messaging service 1306. In certain embodiments, the user devices may be implemented as telephones, cellular telephones, PDAs, computers, etc. For example, a user device 1312, 1314 may be embodied as personal computers implementing the Windows XP operating system and, as discussed above, IM clients such as the Windows Messenger or Office Communicator instant messenger clients. In addition, the user devices 1312, 1314 may include telephony and other multimedia messaging capability using, for example, peripheral cameras, Webcams, microphones, and speakers (not shown) or peripheral telephony handsets, such as the Optipoint handset available from Siemens Information and Communication Networks, Inc.

In certain embodiments, the system 1300 may also include other hardware and/or software components (e.g., gateways, proxy servers, registration server, presence servers, redirect servers, databases, applications, etc.) such as, for example, hardware and software used to support a SIP (Session Initiation Protocol) or other protocol based infrastructure for the system 1300 and allow the registration of SIP devices in the system 1300.

The context agent 1304 may monitor the identity context of one or more identities or the device context of one or more devices. The context agent 1304 may provide or include an application interface that supports identity context, device context, device presence, and/or other functions. Applications may monitor, access, and/or query the context agent 1304 for identity context and/or device context information. The context agent 1304 may be implemented in hardware and/or software operating on one or more servers, computer systems, host or mainframe computers, workstations, etc. In some embodiments, the context agent 1304 may be operating on some or all of the same devices as other components in the system 1300.

The PAS 1302 may be or include an application that monitors the presence and availability of devices. That is, the PAS 1302 monitors the device context of one or more devices. In some embodiments, one or more of the devices may be associated with identities whose context may be used or monitored by one or more context oriented applications. The PAS 1302 may be implemented in hardware and/or software operating on one or more servers, computer systems, host or mainframe computers, workstations, etc. In some embodiments, the PAS 1302 may be operating on some or all of the same devices as other components in the system 100.

In some embodiments, the PAS 1302 may be or include an application that communicates with or is connected to one or more registered devices (e.g., devices 1312, 1314) that allows devices to register with the system 100 or helps to facilitate their registration. For example, in a SIP environment, the devices 1312, 1314 may be registered with the system 100 and may show up or be described in registration databases as being assigned to particular identities. The context agent 1304 may register with the PAS 1302 and receive device context and/or information from the PAS 1302 regarding the devices 1312, 1314. In some embodiments, the PAS 1302 may provide context information to applications upon request, periodically or in accordance with some other plan or procedure.

The PAS 1302 may also couple to or be in communication with, a cellular network identification unit 1308 that receives cellular network information from subscribers, in a manner similar to that discussed above. It may then be provided to the context agent 1304 for transmission to user devices and applications.

Figure 14:
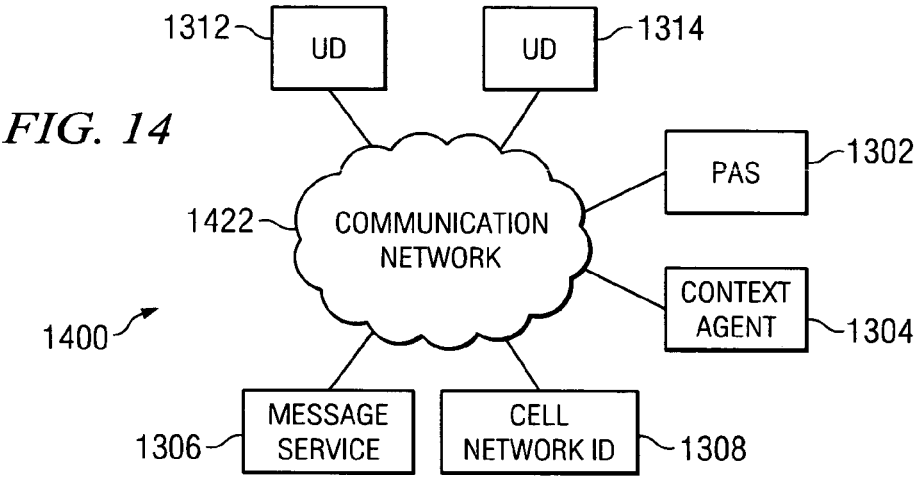
FIG. 14 is a diagram illustrating a system according to embodiments of the present invention.

In certain embodiments of the present invention, one or more of the components of the system 1300 may be connected to or in communication with each other via a communication network. For example, turning now to FIG. 14, a system 1400 including the components of the system 1300 is illustrated, wherein some or all of the components are in communication via a network 1422. The network 1422 may be or include the Internet, World Wide Web, a local area network, or some other public or private computer, cable, telephone, client/server, peer-to-peer, or communication network or intranet. In some embodiments, the communication network can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 1422 may be implemented using a TCP/IP network and may implement voice or multimedia over IP using, for example, the Session Initiation Protocol (SIP).

Figure 15:
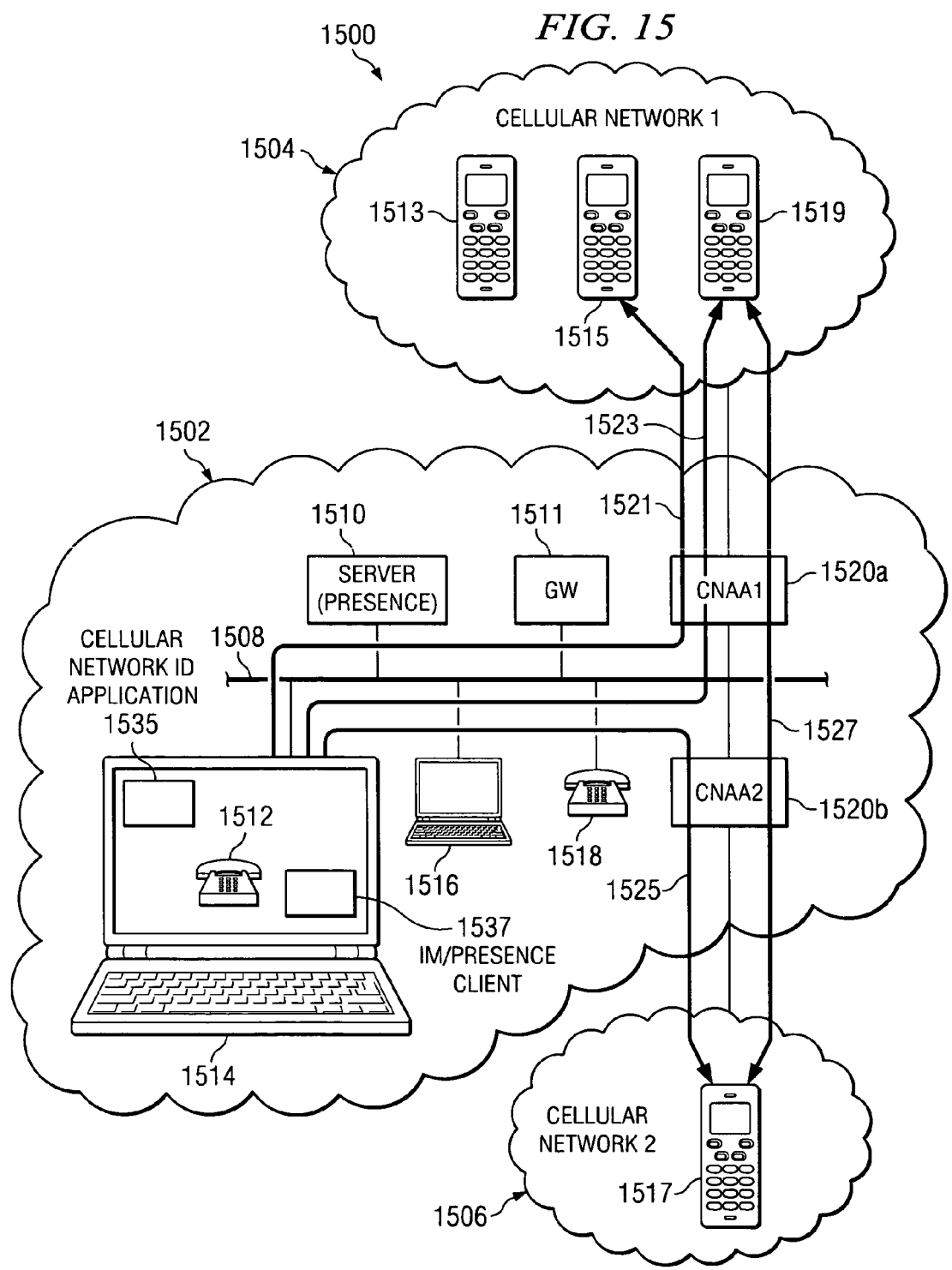
FIG. 15 is a diagram illustrating a system according to embodiments of the present invention.

Turning now to FIG. 15, a diagram illustrating a particular exemplary network configuration 1500 according to an embodiment of the present invention is shown. The network configuration 1500 includes an enterprise or private network 1502, a first cellular network 1504, and a second cellular network 1506. The private network 1502 may include a local area network 1508, a server 1510, one or more client devices 1514, 1516, 1518, and cellular network gateway appliances 1520a, 1520b. In the example illustrated, cellular network 1504 supports cell phones 1513, 1515 and 1519; cellular network 1506 supports cell phone 1517. In certain embodiments, a suitable service including a server that may be adapted for use in conjunction with embodiments of the present invention is the OpenScape system, available from Siemens Corporation. The network may be implemented as a VoIP network, for example, employing the SIP protocol.

As will be explained in greater detail below, the server 1510 may maintain a database of user preferences and cellular networks. The client devices may be embodied as user client portals including a telephony application 1512 and may be operable to select a called party and set calling party device preferences. Thus, the client device may include a presence client (not shown) interfaced to cellular network identification control units 1520a, 1520b, similar to those discussed above. In operation, in certain embodiments, the server 1510 can call out by using the appropriate cellular network appliance, which operates as a cellular device. The connection is then deemed by the cellular network to be of devices on the same network and there will therefore be no charge. In other embodiments, the server 1510 can be instructed to call out via a first call leg to a called party and call out via a second call leg to the calling party if they are on the same cellular network (using standard telephony gateways (not shown)), and then connect or transfer the calls.

More particularly, according to a first embodiment of the present invention, a user may be associated with a network client device 1514 and a cellular telephone 1519. The user may use his client device 1514 to program his cellular network preference to the server 1510, in a manner similar to that discussed above. When the user wishes to make a phone call to the cellular user 1515, he has at his disposal the cellular network information. He can then use his cell phone 1519 to make the call free of charge.

Alternatively, he can activate his client application 1512 on his client device 1514 (and, in particular, his telephony application) to cause the server 1510 to call out to a cellular telephone 1515 over the LAN via gateway appliance 1520a at 1521. (He could also call out to a cellular telephone on network 1506 over the LAN via gateway 1520b). He can then communicate using his client device telephony application 1512, again free.

In other embodiments, he can activate his client application 1512 on his client device 1514 (and, in particular, his telephony application) to cause the server 1510 to call out to his cellular telephone 1519 via gateway appliance 1520a, at 1523, and also call out to the cellular telephone of a user of another network, such as cellular telephone 1517 via gateway appliance 1520b, at 1525, and connect or redirect the call at 1527.

That is, when the user selects calling a cell phone party using his client 1514, the server 1510 will check which cell network the user and called party use. The server 1510 will then call out to the called party using the appropriate cellular interface, and call out to the user using his cellular interface. The server 1510 will then connect the calls over the LAN 1508 via the cellular gateway appliances or interfaces. To each cellular network, it appears as if the user and the called party make use of the common network and thus are not charged for the call.

Figure 16A:
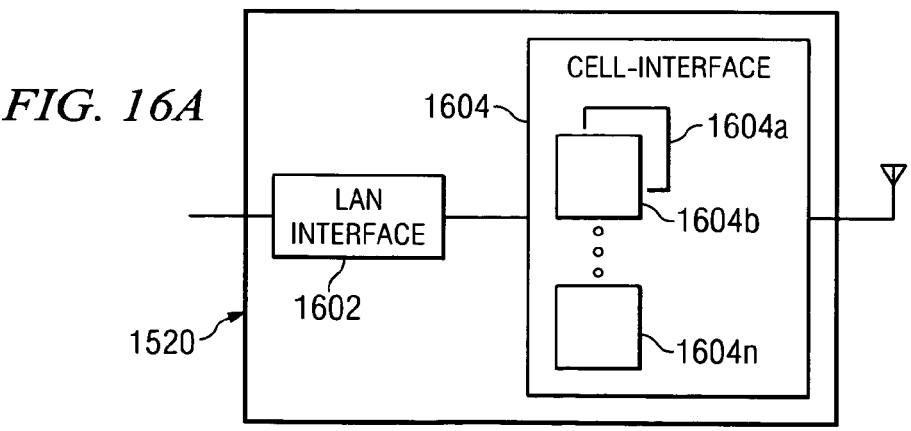

Turning now to FIG. 16A, a block diagram of an exemplary cellular gateway appliance 1520 is shown. The appliance 1520 includes a LAN interface 1602, and a cellular interface 1604. In certain implementations, the cellular interface 1604 may include a plurality of cellular devices 1604a-1604n, so the appliance can support more than one caller to the particular cellular network, if desired.

As will be discussed in greater detail below, in certain embodiments, the cellular gateway appliance 1520 functions to receive VoIP telephony commands and media streams from the LAN (FIG. 12), performs necessary transcoding, etc., and generates any necessary cellular signaling.

In particular, as shown in FIG. 16B, the LAN interface 1602 may be embodied as a SIP (Session Initiation Protocol) interface. That is, the LAN interface 1602 may include one or more SIP clients 1606 for communicating over the LAN. A transcoder 1608 may be provided for converting received RTP media (or other) into the protocol used for the cellular network.

A selector 1610 may be used to select which of the cellular interfaces is to be used. In certain embodiments, the selector 1610 merely provides a serial routing of the call to a next available cellular interface. In this case, each of the interfaces may be provided with its own telephone number, and any identification comes from "system," i.e., a predefined name associated with the number of the interface.

In other embodiments, the selector 1610 may also provide individual identification such that while the call can be routed over any of the cellular interfaces 1604, the calling party can be identified, over the cellular network. This may, for example, be used by reading the SIP INVITE command from the LAN, extracting the "From" (or P-Asserted-Identity or other field) and using this information populate the originating party identification field(s) in the cellular network.

The cellular interfaces may allow for both voice and data transmission on the cellular network and may include a master control unit (MCU) 1612 and digital signal processor (DSP) 1614, which performs any necessary filtering and encoding, and the like. The voice signals are then provided to the RF front end unit 1616, which perform RF modulation functions, and then transmitted to the network. Similarly, in the downlink direction, signals are received and demodulated in the RF front end unit 1616. The signals are then received at the DSP 1614, filtered and decoded, then converted using transcoder 1610, and then out the SIP interface 1606.

Exemplary cellular network standards include IS-136 TDMA and GSM. Others, however, may be implemented without departing from the scope of the present invention. It is noted that, in other embodiments, a single RF unit may be shared by multiple cellular telephone interfaces. In still others, the cellular interfaces may be implemented as plural GSM SIM cards. Suitable GSM interface modules are available from Siemens Corporation.

Turning now to FIG. 17A, a flowchart 1700 illustrating operation of embodiment of the present invention is shown. The particular arrangement of elements in the flowchart 1700 is not meant to imply a fixed order to the elements; embodiments can be practiced in any order that is practicable.

In a step 1702, the user can use his client portal 1512 to select or dial the called party. In a step 1704, the server 1510 can identify the called party. In a step 1706, the server 1510 can receive the resulting call setup request and can identify the called party's cellular network (cell network information can be provided in a manner similar to that discussed above). In a step 1708, the server 1510 calls the called party via the cellular device 1520a, 1520b corresponding to the appropriate network. For example, the server 1510 can set up a SIP call to the cellular appliance 1520, which functions as a SIP device gateway. The cellular device 1520 then calls out to the called party cellular telephone on the cell network. In a step 1710, the server 1510 calls out to the calling party cellular telephone via the appropriate cellular interface. Again, this may be a SIP call to the gateway appliance. It is noted that the order of calling can be reversed: that is, the calling party could be called first. In a step 1712, the appliances 1520 connect to the respective called and calling party telephones. Finally, in a step 1714, the server 1510 connects the calls by routing the media across the LAN between the two gateway appliances 1520a, 1520b.

Turning now to FIG. 17B, a flowchart 1750 illustrating operation of embodiment of the present invention is shown. The particular arrangement of elements in the flowchart 1750 is not meant to imply a fixed order to the elements; embodiments can be practiced in any order that is practicable.

In a step 1752, a user can employ his client interface 1512 to select or dial a called party. In a step 1754, the server 1510 identifies the called party by accessing the appropriate database. In a step 1756, the server 1510 identifies the cellular network of the called party (again, this information may be provided in a manner similar to that discussed above). In a step 1758, the server 1510 selects the appropriate gateway appliance 1520. Finally, in a step 1760, the server 1510 calls out to the called party cell phone via the gateway appliance, and connects to the calling user. Again, this can include the server 1510 setting up a SIP call to the appropriate gateway appliance, which then performs any necessary transcoding, etc., for calling out on the cellular network.

Turning now to FIG. 18, a signaling diagram illustrating operation of an embodiment of the present invention is shown.

At 1801, a user can use his telephony application/portal 1512 (FIG. 15) for conducting the call. At 1802, a user can use his client portal 1512 to select or dial a called party for calling. This information is transmitted to the server 1510, for example, in a SIP INVITE command. At 1804, the server 1510 identifies the called party from the SIP INVITE command and accesses its database(s) for the preferred cellular network or networks. At 1806, the server 1510 directs the appropriate cellular gateway appliance 1520b to call out to the called party. At 1808, the cellular gateway appliance 1520b identifies the called party number and calls out to the appropriate cell phone on the cellular telephone network. At 1810, the server 1510 connects the call.

At 1803, the user can use his cell phone for a conversation with a user on another cellular network. At 1812, a user can use his client portal 1512 to select a called party for calling. This information is transmitted to the server 1510, for example, using the SIP INVITE command. At 1814, the server 1510 identifies the called party and the preferred cellular network or networks of the calling party. At 1816, the server directs the appropriate cellular appliances to call out to the called party and the calling party cell phones. Again, this may be done via the appropriate SIP INVITE command. At 1818, the cellular gateways 1520a, 1520b call out to the appropriate cell phones. At 1820a, b, the server 1510 connects the call, for example, by directing one or more of the gateway appliances 1520a, 1520b to redirect the calls. The call is then connected at 1822 via the gateways.

Figure 19:
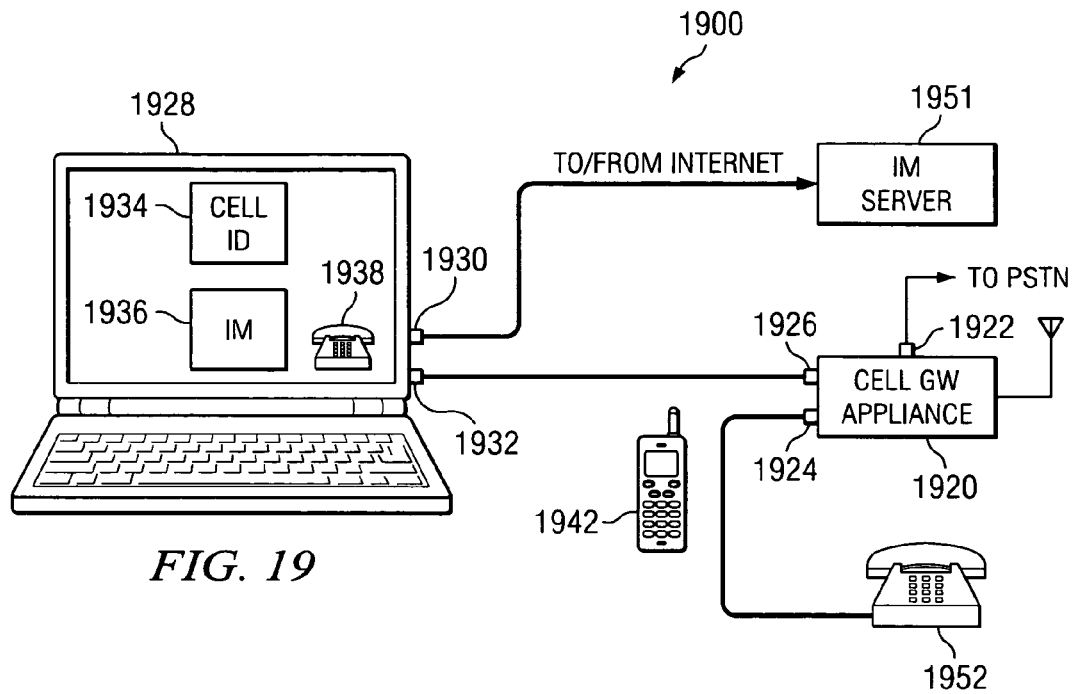
FIG. 19 is a diagram of system according to an embodiment of the present invention.

An alternate network configuration for an embodiment of the present invention is shown in FIG. 19. In particular, the system 1900 of FIG. 19 may be representative of, for example, a household computer or computer system. As shown, the system 1900 include a personal computer 1928 and a cellular gateway appliance 1920. In addition, a cell phone 1942 may be provided.

The personal computer 1928 may include a unified messaging system having an Instant Messaging or presence client 1936, a cellular network identification control unit 1934, and a telephony client 1938 in accordance with the present invention. The personal computer 1938 is generally similar to the personal computer(s) described above. In the embodiment illustrated, the computer 1938 couples to the Internet (and hence IM server 1951 via an interface 1930, such as an RJ-11 interface). In other embodiments, the connection to the Internet may be via the cellular network. In addition, in the embodiment illustrated, the personal computer 1928 may couple to the cellular gateway appliance 1920 via USB interfaces 1932, 1926. It is noted that in other embodiments, other interfaces, such as wireless interfaces, may likewise be employed.

In addition, the cellular gateway appliance in the embodiment illustrated can support calls from analog telephone 1952 via link 1924. That is, in operation, not only can users of the personal computer 1928 make calls via the cellular network, but also users of the analog telephone 1952. The gateway appliance may also include an interface to the PSTN as well as to the cellular network.

Figure 20:
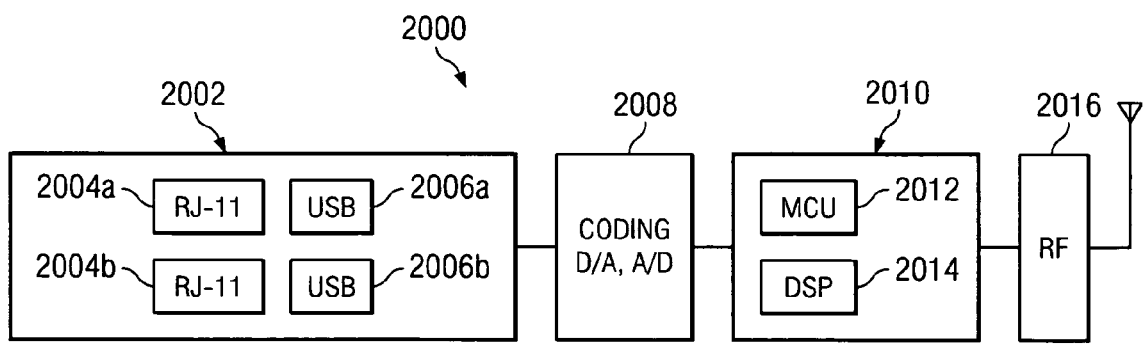
FIG. 20 illustrates an exemplary cellular gateway appliance according to embodiments of the present invention.

More particularly, turning now to FIG. 20, a block diagram of an exemplary cellular network gateway appliance 1920 in accordance with a particular embodiment of the present invention is shown.

In the example illustrated, the cellular gateway appliance 2000 includes network interfaces 2002, coding control 2008, cellular interface 2010, and RF unit 2016.

The network interfaces 2002 may include one or more RJ-11 interfaces 2004*a*, 2004*b*, and USB interfaces 2006*a*, 2006*b*, as well as necessary support hardware (not shown). Typically, the RJ-11 interfaces couple to the telephones 1952 and PSTN (and provide, e.g., suitable tip-ring connections) and the USB interfaces couple to the personal computers. The coding/transcoding block 2008 provides any necessary D/A and A/D conversions, as well as coding and transcoding. The cellular interface 2010 can include a master control unit 2012 as well as DSP 2014 for any other needed functions, similar to those of FIG. 16A, 16B. As in the above embodiments, the cellular gateway appliance may include suitable GSM interface modules, available from Siemens Corporation.

Turning now to FIG. 21A, a flowchart 2100 illustrating operation of embodiment of the present invention is shown. The particular arrangement of elements in the flowchart 2100 is not meant to imply a fixed order to the elements; embodiments can be practiced in any order that is practicable.

In a step 2102, the user can select the called party using his PC interface client. In a step 2104, the server 1951 can identify the called party and his cell network. (In other embodiments, the PC itself can identify the called party cell network). In a step 2106, the system determines if the called party is a cell phone on the same network. If not, then the call can be made through the POTS (e.g., if the call is local) or via the cell network, at 2110. In other embodiments, the call may be automatically routed through the cell network.

Turning now to FIG. 21B, a flowchart 2150 illustrating operation of embodiment of the present invention is shown. The particular arrangement of elements in the flowchart 2150 is not meant to imply a fixed order to the elements; embodiments can be practiced in any order that is practicable.

In a step 2152, a user can take a conventional telephone 1952 off hook. The cell network gateway appliance 1920 will detect this and provide a dial tone. In a step 2154, the user can dial the called party via the conventional telephone 1952. In 2156, the DTMF tones inputted are received and detected at the gateway appliance 1920. At a step 2156, the gateway appliance 1920 converts the received DTMF tones to cellular network signaling and dials on the cellular network in a step 2160. In a step 2162, the connection is completed to the cellular network.

Now referring to FIG. 22, a representative block diagram of a computer or processing device 2200 suitable for use as a user device or server according to embodiments of the present invention is shown. In some embodiments, the computer 2200 may include or operate a messaging client and a presence client. The computer 2200 may be embodied as a single device or computer, a networked set or group of devices or computers, a workstation, mainframe or host computer, etc. In some embodiments, the computer 2200 may implement one more elements of the methods disclosed The computer 2200 may include a processor, microchip, central processing unit, or computer 2202 that is in communication with or otherwise uses or includes one or more communication ports or network interfaces 2204 for communicating with user devices and/or other devices. The communication ports 2204 may include such things as local area network adapters, wireless communication devices, Bluetooth technology, cellular network interfaces, etc. The computer 2200 also may include an internal clock element 2206 to maintain an accurate time and date for the computer 2200, create time stamps for communications received or sent by the computer 2200, etc.

If desired, the computer 2200 may include one or more output devices 2208 such as a printer, infrared or other transmitter, antenna, audio speaker, display screen or monitor, text to speech converter, etc., as well as one or more input devices 2210 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the computer 2200 may include a memory or data storage device 2212 to store information, software, databases, documents, communications, device drivers, etc. The memory or data storage device 2212 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. Thus, the storage device 2212 may include various combinations of moveable and fixed storage. The computer 2200 also may include memory 2214, such as ROM 2222 and RAM 2218.

The processor 2202 and the data storage device 2212 in the computer 2200 each may be, for example: (i) located entirely within a single computer or other computing device; or (ii) connected to each other by a remote communication medium, such as a serial port cable, telephone line or radio frequency transceiver. In one embodiment, the computer 2200 may be implemented as one or more computers that are connected to a remote server computer, as will be explained in greater detail below.

A conventional personal computer or workstation with sufficient memory and processing capability may be used as the computer 2200. The computer 2200 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 2202. Other suitable processors may be available from Motorola, Inc., AMD, or Sun Microsystems, Inc. The processor 2202 also may be embodied as one or more microprocessors, computers, computer systems, etc.

Software may be resident and operating or operational on the computer 2200. The software may be stored on the data storage device 2212 and may include a control program 2222. In the client devices, the control program 2222 may include the IM clients and cellular network identification control units. In the server, the control program 2222 can include the PAS, context agent, text messaging service, and the cellular network identification unit.

The client control program 2222 may control the processor 2202. The processor 2202 may perform instructions of the client control program 2222, and thereby operate in accordance with the methods described in detail herein. The client control program 2222 may be stored in a compressed, uncompiled and/or encrypted format. The client control program 2222 furthermore may include program elements that may be necessary, such as an operating system, a database management system and device drivers for allowing the processor 2202 to interface with peripheral devices, databases, etc. Appropriate program elements are known to those skilled in the art, and need not be described in detail herein.

The computer 2200 also may include or store user information regarding identities, user devices, contexts, presence information, communications, etc. These may include, for example, default messages, etc. Information regarding other application program data may be stored in application databases (not shown)

According to some embodiments, the instructions of the control program may be read into a main memory from another computer-readable medium, such as from the ROM 2216 to the RAM 2218. Execution of sequences of the instructions in the control program causes the processor 2202 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 2202, communication ports 2204, clock 2206, output device 2208, input device 2210, data storage device 2212, ROM 2216 and RAM 2218 may communicate or be connected directly or indirectly in a variety of ways. For example, the processor 2202, communication ports 2204, clock 2206, output device 2208, input device 2210, data storage device 2212, ROM 2216 and RAM 2218 may be connected via a bus 2234.

While specific implementations and hardware/software configurations for the computer 2200 have been illustrated, it should be noted that other implementations and hardware configurations are possible and that no specific implementation or hardware/software configuration is needed. Thus, not all of the components illustrated in FIG. 22 may be needed for the computer 2200 implementing the methods disclosed herein.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, in some embodiments, many, if not all, of the elements for the methods described above are optional or can be combined or performed in one or more alternative orders or sequences and the claims should not be construed as being limited to any particular order or sequence, unless specifically indicated.

Each of the methods described above can be performed on a single computer, computer system, microprocessor, etc. In addition, in some embodiments, two or more of the elements in each of the methods described above could be performed on two or more different computers, computer systems, microprocessors, etc., some or all of which may be locally or remotely configured. The methods can be implemented in any sort or implementation of computer software, program, sets of instructions, programming means, code, ASIC, or specially designed chips, logic gates, or other hardware structured to directly effect or implement such software, programs, sets of instructions, programming means or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. The drawings are not necessarily to scale and illustrate the device in schematic block format. It is intended that the scope of the invention be defined by the claims appended hereto, and their equivalents.

What is claimed is:

1. A telecommunication method comprising:
    identifying cellular networks with an instant messaging service for each of a plurality of users;
    identifying called and calling parties' cellular telephone networks, at least one of said called and calling party being one of said plurality of users;
    creating a first call leg to a called party cellular telephone via a first gateway associated with the identified first cellular network; and
    creating a second call leg to a calling party cellular telephone via a second gateway associated with the identified second cellular network, wherein said cellular networks are identified in one or more buddy lists, and a server creates said first call leg and said second call leg.

2. A telecommunications method in accordance with claim 1, wherein identified said called and calling parties cellular telephone networks are different networks and said first call leg and said second call leg are connected through said first gateway and said second gateway over a local area network.

3. A telecommunications method in accordance with claim 1, wherein
    each of said first call leg and said second call leg being selected ones of said identified cellular networks, said first gateway and said second gateway being a gateway to a respective identified said cellular network.

4. A telecommunications system, comprising:
    a local area network (LAN) including a plurality of user devices having unified communications applications and a plurality of cellular network gateways;
    means interfaceable via the unified communications application for identifying a cellular network associated with a called party and a calling party, said interfaceable means including an instant messaging system identifying cellular networks associated with a plurality of users, ones of said plurality of cellular network gateways being a gateway to a respective identified said cellular network, wherein said cellular networks are identified in one or more buddy lists;

means for creating a first call leg to a called party cellular telephone via a first gateway associated with the identified first cellular network;

means for creating a second call leg to a calling party cellular telephone via a second gateway associated with the identified second cellular network; and means for connecting the first leg and the second leg such that the called party and said calling party communicate via the LAN.

5. A telecommunications system in accordance with claim 4, said identifying means including presence status display means displaying cellular networks associated with a plurality of users, ones of said plurality of cellular network gateways being a gateway to a respective displayed said cellular network.

6. A telecommunications system in accordance with claim 5, wherein said interfaceable means includes a presence system including said instant messaging system.

7. A telecommunications system, comprising:
a personal computer having a unified communication system including a presence application and a cellular telephone network identifier operably coupled to the unified communication system and configured to identify a cellular telephone network of multiple parties; and
a cellular network gateway appliance operably coupled to the personal computer and configured to allow the unified communication system to make a telephone call via an associated cellular network and identified by the cellular telephone network identifier, wherein said presence application is Instant Messaging and associated said cellular networks are identified in one or more buddy lists.

8. A telecommunications system in accordance with claim 7, wherein said cellular gateway appliance couples to the personal computer via a serial bus, the personal computer presence application identifying cellular networks associated with each of the multiple parties, said cellular network gateway selectively directing calls over said associated cellular network whenever a call is to any of said multiple parties identified as also associated with said associated cellular network.

9. A telecommunications system in accordance with claim 7, wherein said cellular gateway appliance couples to the personal computer via a local area network.

10. A telecommunications system in accordance with claim 9, further including a second cellular gateway appliance that couples to the personal computer via the local area network and wherein the unified communication system is configured to call out to parties on via the local area network and first and second cellular gateway appliances, the personal computer presence application identifying cellular networks associated with each of the multiple parties, said cellular network gateways selectively directing calls over respective associated cellular networks whenever a call with any of said multiple parties is identified as also associated with one of said respective associated cellular networks.

11. A telecommunications method, comprising:
identifying cellular networks with a presence server for each of a plurality of users;
initiating a call from a presence client;
calling out from said presence server to cellular telephones on separate cellular networks via cellular gateway appliances on a local area network; and
connecting the calls via the local area network such that the cellular telephones are deemed to be on a same cellular network, wherein said presence server is an instant messaging (IM) server on a unified messaging system and said presence client is an IM client identifying the cellular networks associated with the cellular telephones.

12. A telecommunications method in accordance with claim 11 said calling out further comprising automatically calling out from a party on a contact list having cellular network identifying indicia, wherein the called party cellular telephone and the calling party cellular telephone are on different cellular networks.

13. A telecommunications system, comprising:
means for identifying cellular networks with a presence server for each of a plurality of users;
means for receiving call initiation from a presence client;
means for calling out from said presence server to cellular telephones on separate cellular networks via cellular gateway appliances on a local area network; and
means for connecting the calls via the local area network such that the cellular telephones are deemed to be on a same cellular network, wherein said presence server is an instant messaging (IM) server on a unified messaging system and said presence client is an IM client identifying the cellular networks associated with the cellular telephones.

14. A telecommunications system in accordance with claim 13 said calling out means further comprising means for automatically calling out from a party on a contact list having cellular network identifying indicia, wherein the called party cellular telephone and the calling party cellular telephone are on different cellular networks.

* * * * *